United States Patent [19]
Lederman et al.

[11] Patent Number: 6,006,881
[45] Date of Patent: Dec. 28, 1999

[54] MOLDABLE PLASTIC ROLLER CLUTCH CAGE WITH IMPROVED CONCENTRICITY CONTROL, MECHANICAL RETENTION, AND LUBRICANT RETENTION

[75] Inventors: Frederick Edward Lederman; Lorenzo Hood, both of Sandusky, Ohio

[73] Assignee: General Motors Corporation, Detroit, Mich.

[21] Appl. No.: 09/154,290

[22] Filed: Sep. 16, 1998

[51] Int. Cl.⁶ .................................................. F16D 41/067
[52] U.S. Cl. ...................................... 192/45; 192/113.32
[58] Field of Search ................................ 192/45, 113.32; 188/82.84; 384/470, 475, 560, 576, 577

[56] References Cited

U.S. PATENT DOCUMENTS

| | | | |
|---|---|---|---|
| 2,977,164 | 3/1961 | Witte | 384/576 |
| 4,054,340 | 10/1977 | Broshkevitch et al. | 384/576 |
| 4,153,309 | 5/1979 | Markfelder et al. | 384/576 |
| 4,236,619 | 12/1980 | Kuroda | 192/45 |
| 4,714,803 | 12/1987 | Lederman | 192/41 R |
| 4,782,931 | 11/1988 | Lederman | 192/70.12 |
| 4,874,069 | 10/1989 | Lederman | 192/45 |
| 4,971,184 | 11/1990 | Lederman | 192/48.92 |
| 5,007,514 | 4/1991 | Hattori et al. | 192/45 |
| 5,042,628 | 8/1991 | Malecha | 192/45 |
| 5,048,651 | 9/1991 | Lederman | 192/45 |
| 5,062,512 | 11/1991 | Lederman | 192/45 |
| 5,129,495 | 7/1992 | Johnston et al. | 192/45 X |
| 5,607,240 | 3/1997 | Kajihara et al. | 384/470 X |
| 5,636,720 | 6/1997 | Lederman | 192/45 |

*Primary Examiner*—Rodney H. Bonck
*Attorney, Agent, or Firm*—Patrick M. Griffin

[57] ABSTRACT

A roller clutch case comprises two molded halves that snap fit into retention grooves on the cam race when inserted from opposite axial directions. The retention features of the cage halves that fit within the retention grooves are inherently stiff, and occupy most of the circumferential extent of the cage halves. Narrow grooves in the cage halves allow the entire structure to shrink inwardly and re expand, so as to allow the retention features to snap into the grooves in spite of their stiffness. In operation, high pressure oil injected between the cage halves pushes the cage halves axially outwardly, but the cage halves are securely retained by the stiff retention features. The oils is substantially trapped between the cage halves by the biasing of the same retention features into the sides of the retention grooves, with only the relatively narrow grooves providing any leak points. Close clearance cross bars in the cage halves help prevent oil migrating to the grooves.

3 Claims, 12 Drawing Sheets

PRIOR ART

FIG. 1

PRIOR ART

FIG. 2

PRIOR ART

FIG. 3

PRIOR ART

MOLDABLE PLASTIC ROLLER CLUTCH CAGE WITH IMPROVED CONCENTRICITY CONTROL, MECHANICAL RETENTION, AND LUBRICANT RETENTION

TECHNICAL FIELD

This invention relates to roller clutch cages in general, and specifically to a plastic roller clutch cage that is easily molded from a minimal number of pieces in such a way as to maximize the retention security of the cage between the clutch races while improving lubricant retention and concentricity control of the races, and also simplifying cage installation.

BACKGROUND OF THE INVENTION

One way clutches used in automotive applications fall into two general categories, sprag clutches and roller clutches. Sprag clutches use the simplest clutch races, consisting of two completely cylindrical pathways, but the most complex wedging elements, consisting of asymmetrical, dumbbell shaped cams that drag along the surfaces during an overrun condition, but which jam between the races to lock up. The load that each cam, with its narrow waist, can sustain is limited, so a large number of them is necessary. Concentricity between the races is maintained by two bordering plain bearing end rings, generally bronze, which are axially retained by separate end rings. Complexity and cost of the clutch is therefore quite high.

Figure 1:
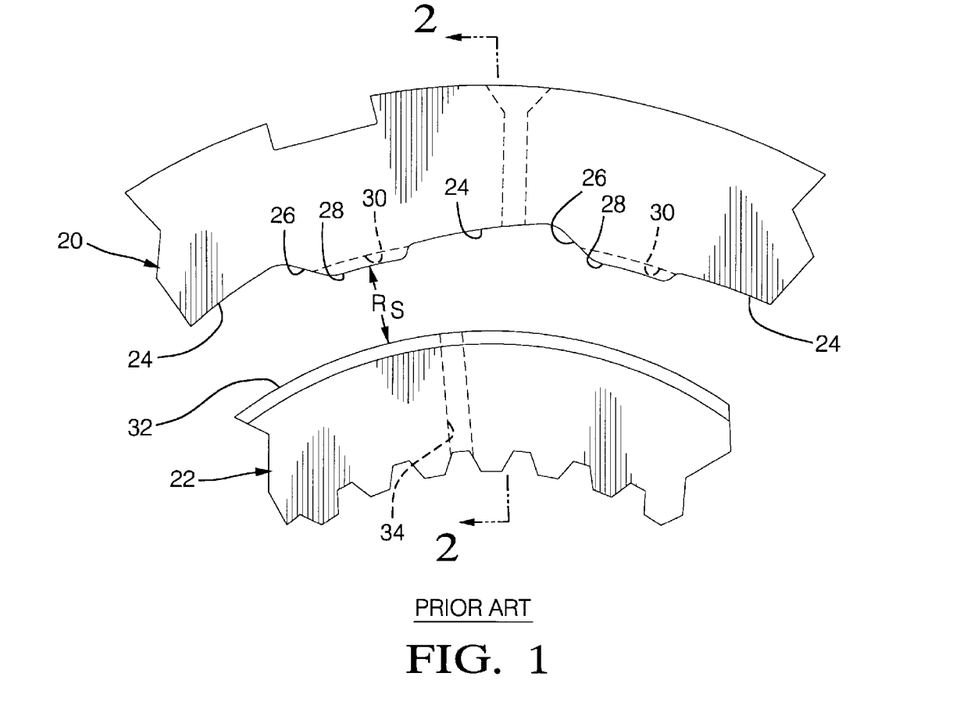
FIG. 1 is an axial view of an arcuate segment of a prior art coaxial cam race and pathway race, with no roller clutch cage yet installed between them.
Figure 2:
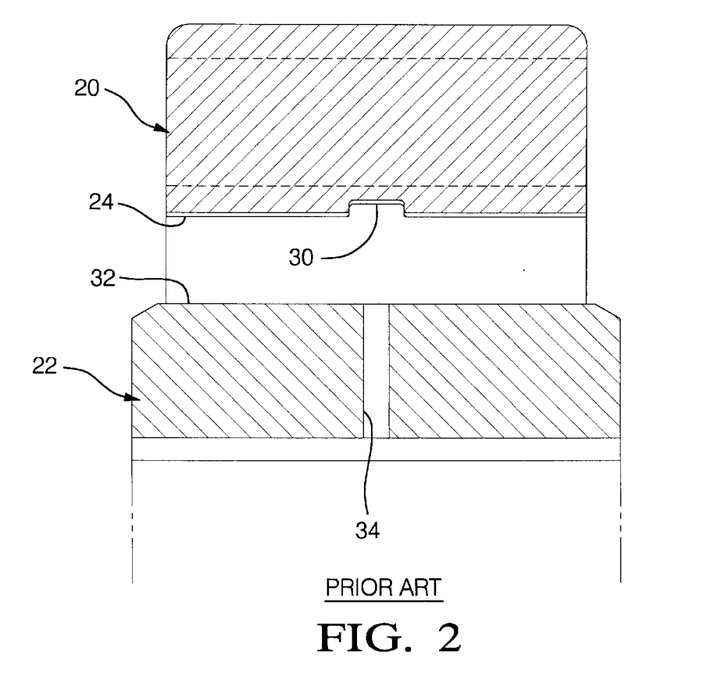
FIG. 2 is a cross section of the races taken in the plane represented by the line 2—2 in FIG. 1.
Figure 3:
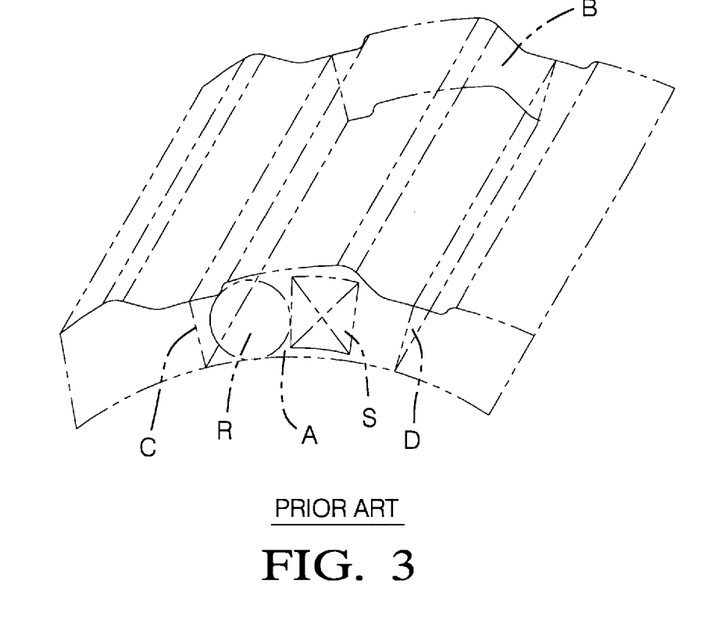
FIG. 3 is a three dimensional schematic of the empty annular space between the races of FIG. 1.

A low cost alternative to the sprag clutch is the roller clutch, in which one of the races is more complex, but the wedging elements are far simpler, stronger, and less costly, costing of simple cylindrical rollers biased toward a wedging position by springs. An example may be seen in FIGS. 1 through 4. One of the clutch races, often (but not necessarily) the inner race 22, has a simple cylindrical pathway 32, as a sprag clutch would have. The other race 20 has a more complex shape, consisting of a regularly spaced series of semi cylindrical bearing surfaces 28 interspersed with saw tooth or wedge shaped cam ramps 24 and cam hooks 26. These together define what may be referred to as individual wedging spaces, as shown in FIG. 3, each of which is an imaginary four sided volume surrounding each spring-roller pair S-R. The circumferentially extending sides of each wedging space, indicated at A and B, represent an equal fraction of the total circumference of the annular space between the races 20 and 22. The axially extending sides of that four sided space, indicated at C and D, are defined by the pathway 32 and the individual bearing surfaces 28, which are radially spaced from pathway 32 by a consistent distance Rs, at least when races 20 and 22 are coaxial. Conversely, if the distance Rs is consistently maintained by some inserted structure, then the races 20 and 22 are maintained coaxial. This is exactly how roller clutches do maintain the races coaxial, by closely supporting the bearing surfaces on the pathway with semi cylindrical, solid, axially extending journal blocks.

Another important consideration with overrunning clutches of either type used in automotive applications is lubrication. It is important that the pathway be kept lubricated at the interface where it rubs on the end ring or journal block and on the sprag element or roller. An even more significant consideration with overrunning clutches used as passively acting shift speed matches in vehicle automatic transmissions is the ability to direct pressurized lubricant radially outwardly from and through the inner race, through the clutch, and through the outer race to cool a clutch disk pack splined to the outside of the outer race. It is necessary to either closely axially confine the pressurized lubricant between the axially spaced cage side rails of the clutch (i.e., to closely fill the axially spaced sides A and B of the wedging spaces), or to somehow route the lubricant completely around the roller clutch. Various past proposed mechanisms to so direct the pressurized lubricant may be seen in co-assigned U.S. Pat. Nos. 4,714,803; 4,782,931; 4,874,069; and 4,971,184. Briefly summarized, each of these provide additional structure used to confine or redirect lubricant, additional beyond the minimal elements necessary for the clutch cage itself. This, of course, adds cost and complexity that it would be advantageous to avoid.

A few known designs seek to combine sprag clutch type bearing end rings for concentricity control with caged cylindrical rollers as wedging elements. An example may be seen in U.S. Pat. No. 4,236,619. There, simple annular metal end rings 4 are shown bordering a plastic roller clutch cage, and acting as plain bearings to maintain concentricity. While it is recited that the end rings would prevent lubricant leakage, there is no structure disclosed that would block or prevent the end rings from simply being blown axially outwardly if high pressure oil were introduced between them. A later design in the same vein may be seen in U.S. Pat. No. 5,042,628. There, solid metal end rings 22 are formed with a series of outwardly projecting, small tabs 22d that are intended to snap fit into a dedicated circular groove machined into the pathway. This would provide more security against axial end ring blow out than the plain rings 4 of U.S. Pat. No. 4,236,619. However, since neither a solid metal end ring or integral tabs have much inherent flexibility, there is only a limited area of radial overlap (tab in groove) to provide retention. Moreover, pressurized oil could escape around the tabs 22d which, again, have a very limited area and would consequently provide very little blockage against escape.

A more recent design covered in co-assigned U.S. Pat. No. 5,632,720, shown in FIG. 4, takes a different approach. Concentricity control is done through close fitting journal blocks 48, but these, and the entire cage itself, are split into tow halves along a central plane so that each cage half can radially span the entire annular space between the races 20 and 22, and yet still be simply individually molded by an axial draw technique. By matching the shape of the outer edge of the cage side rails closely, all four sides of the wedging space as defined above can be almost solidly spanned and filled, providing both load support between the races (concentricity control), and a good measure of lubricant confinement. To retain the cage halves after installation, the inner ends of the journal blocks 48 are molded with barbs 54 at the end, and with axially extending slots 50, which give the two halves of the cage good flexibility. The barbs 54 snap into a center slot 30 in the cam race 20 when the cage is installed, although a special jig is needed to guide the cage into place.

Figure 4:
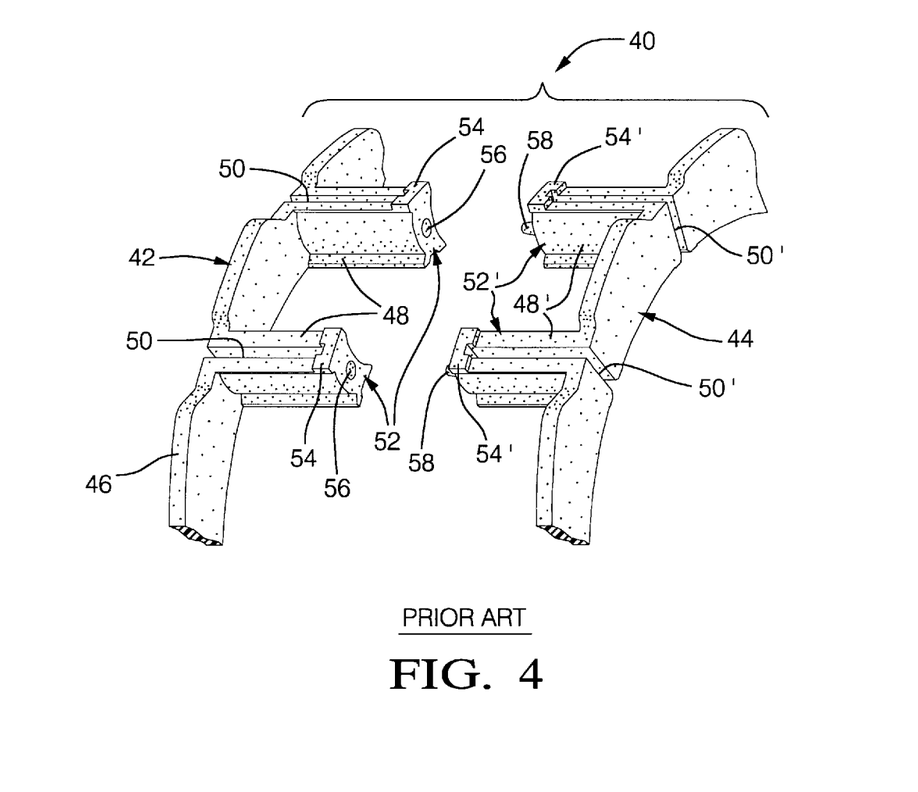
FIG. 4 is a perspective view of as much of the prior art cage as would fit between the segments of the races shown in FIG. 1, before the two cage segments have been assembled together.

An inherent drawback recognized in the above patent is the fact that the retention strength of the cage halves is limited by the degree of radial overlap between the narrow barbs 54 and the edges of the internal groove 30. Were the highly pressurized lubricant retained too completely between the cage side rails, they might, as a consequence, be blown axially outwardly, overcoming the retention strength of the barbs 54, or at least opening up a leak path at bowed out areas. Therefore, controlled leakage of lubricant outwardly through the groove 30 and slots 50 is deliberately provided for. In addition, it is inherently more difficult to shape match the convex saw-toothed edge of a cage side rail to the concave saw-tooth shape of a cam race, than to match a simple cylindrical bearing to a cylindrical pathway. Therefore, some radial clearance between the edge of the cage side rail 46 and the cam race's cam ramps 24 and cam hooks 26 is, as a practical matter, inevitable, which can also create a lubricant leak path. Close conformation between the race surfaces 32 and 28 and the journal blocks 48 would have to take preference over close conformation to the edges of the cage side rails 46, since lubricant leakage can be tolerated more easily than race eccentricity.

SUMMARY OF THE INVENTION

The invention provides a simply molded plastic roller clutch cage which does not require a compromise between lubricant retention efficiency and race concentricity control. More efficient lubricant retention and improved, simplified cage installation retention are provided as well.

In the preferred embodiment disclosed, each outer face of the cam race is machined with a cylindrical pilot surface that is radially outboard of the cam ramps, cam hooks and semi cylindrical pads. The pilot surface has a predetermined radial spacing from a conventional, coaxial cylindrical pathway. A circular retention groove of larger diameter is adjacent to each pilot surface. Each retention groove also has a predetermined radial spacing from the coaxial cylindrical pathway, and the two retention grooves are axially spaced apart sufficiently to leave room for conventional rollers and springs between them, as well as room for a cage to surround and contain the rollers. Each race also contains several oil passages extending radially through it.

The roller clutch cage includes two molded plastic halves, each of which can be by pass molded. Each cage half consists of a plurality of evenly spaced, annular sections, each with a radial width spanned by inner and outer semi cylindrical edges that is just slightly smaller than the radial spacing between pathway and pilot surface. Each cage half annular section is backed by a coextensive retention and sealing ring section, each of which has an outer edge with a diameter just slightly less than the retention groove, an axial thickness slightly less than the retention groove, and a flat outer face. The annular sections of each cage half are joined by an equal plurality of integrally molded cross bars, each of which is approximately half as long as the retention groove axial spacing. Each cross bar fits between a respective cam race pad and pathway, and abutted with a cam hook, but is not radially thick enough to ride directly on the pathway and serve as a concentricity maintaining journal block. Each cross bar is cut by a narrow, axially extending slot that runs almost to the end, giving it a general U shape. Because of the thinness of the slots, the flat outer faces of the ring section occupy a large area, almost the entire circumference of the circle. The axially opposed inner surfaces of each cage half annular section also has an arcuate slot that receives a guide rail of a roller control car.

The cage halves are installed to the cam race by pushing them axially inside and onto the cam race from each direction until the ring sections snap into the retention grooves, with the control cars and springs captured axially between. The cross bar slots give the cage halves enough flexibility to allow them to radially contract during installation, with no separate installation jig or tool. Post installation, there is mounting clearance, radial and axial, between the ring sections and the retention groove, and a smaller radial clearance between the inner surfaces of the cage cross bars and the pathway. There is a very slight radial pilot clearance between the edges of the annular sections and the respective pathway and pilot surfaces of the races, smaller than the mounting clearances.

During clutch operation, close concentricity is maintained by the slight pilot clearance, without interference from the larger mounting clearances around the rings sections. The annular sections subtend most of the circumference of the circle, so load support is very good. When pressurized oil runs through the races, between the cage halves, it forces them axially outwardly. One each axial side of the clutch, at the inner diameter, because of the tight pilot clearance, only enough oil leaks to the pathway to provide running lubrication. At the outer diameter, the outer faces of the rings sections are forced into the outside of the retention grooves by the same oil pressure. Because of the large surface area of the flat ring section faces, an almost complete, tight oil seal is provided, which tightens with greater pressure. The ring sections, therefore, provide both improved mechanical retention force and improved lubricant retention, independently of the concentricity control provided by the annular cage half sections.

BRIEF DESCRIPTION OF THE DRAWINGS

These and other features of the invention will appear from the following written description, and from the drawings, in which.

DESCRIPTION OF THE PREFERRED EMBODIMENT

Figure 5:
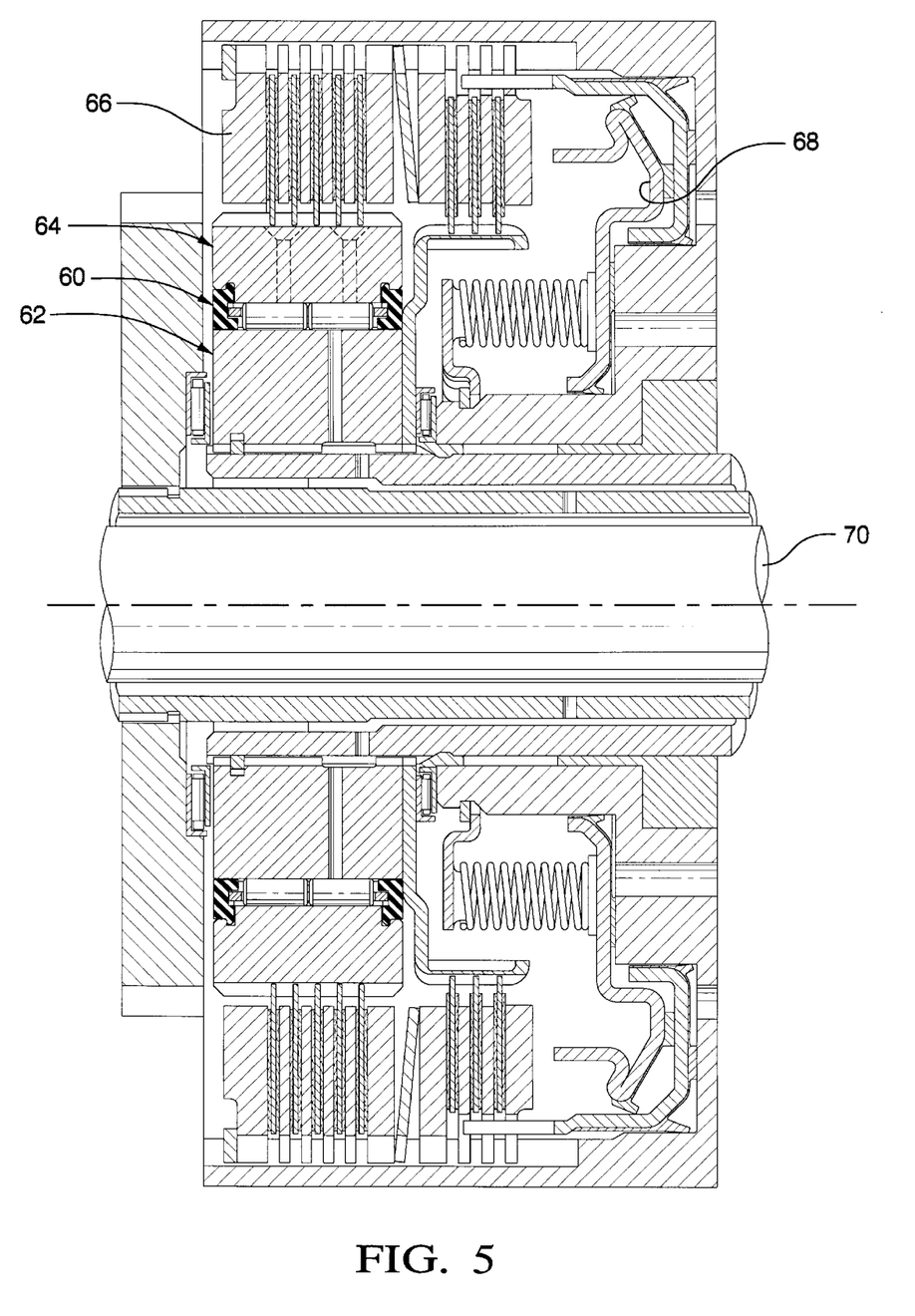
FIG. 5 is a cross sectional view of a pair of clutch races with an installed clutch between, made according to the invention, and incorporated into an automatic transmission.
Figure 6:
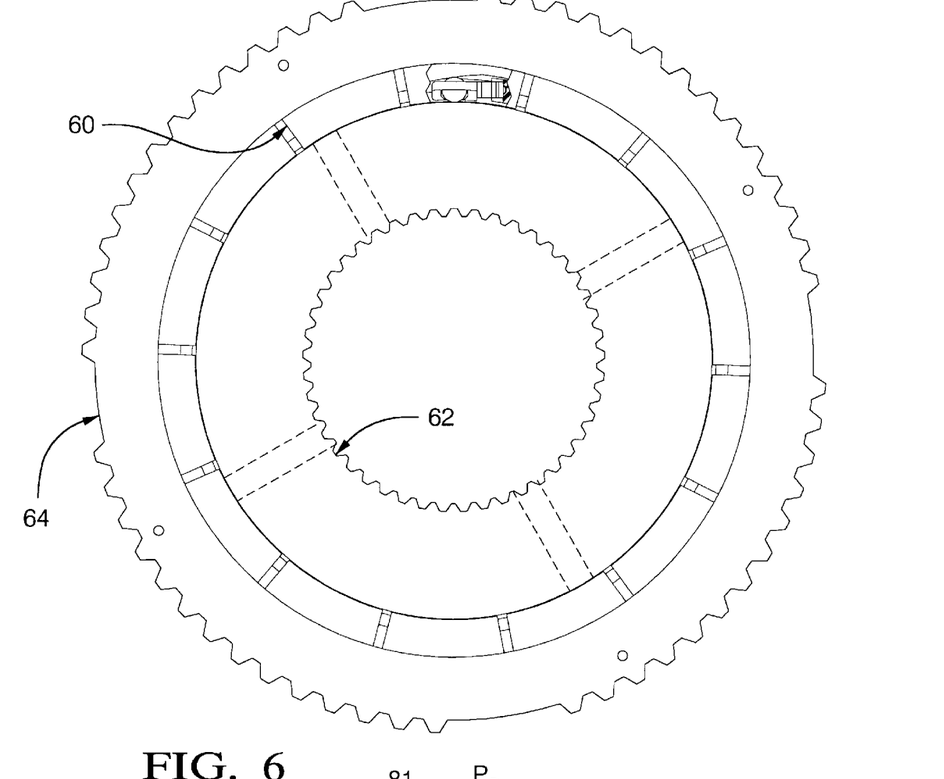
FIG. 6 is an axial view of just the clutch races and clutch.

Referring first to FIGS. 5 and 6, a preferred embodiment of a roller clutch made according to the invention, indicated generally at 60, is installed between an inner pathway race, indicated generally at 62, and an outer cam race 64. The races 62 and 64 are incorporated within a disk pack 66 of an automotive automatic transmission. When the disk pack 66 is compressed by a piston 68, torque is transferred between the races 62 and 64 when, and only when, the races 62 and 64 are turning at the same speed, and the roller clutch 60 can lock up, which gives a smooth shift feel. Efficient lock up is dependent upon maintaining a close concentricity between the races 62 and 64. When the disk pack 66 is de-activated, a pressurized oil stream is pumped from around a central shaft 70 to and through the races 62 and 64, and ultimately out to and through the disk pack 66 to lubricate it. The pressurized oil is delivered to the disk pack 66 efficiently only if it is transferred radially from inner race 62 to and through outer race 64 without a great deal of pressure loss past the clutch 60. Clutch 60 provides both good concentricity control and superior pressurized oil retention, through simple but independently acting structural features.

Figure 7:
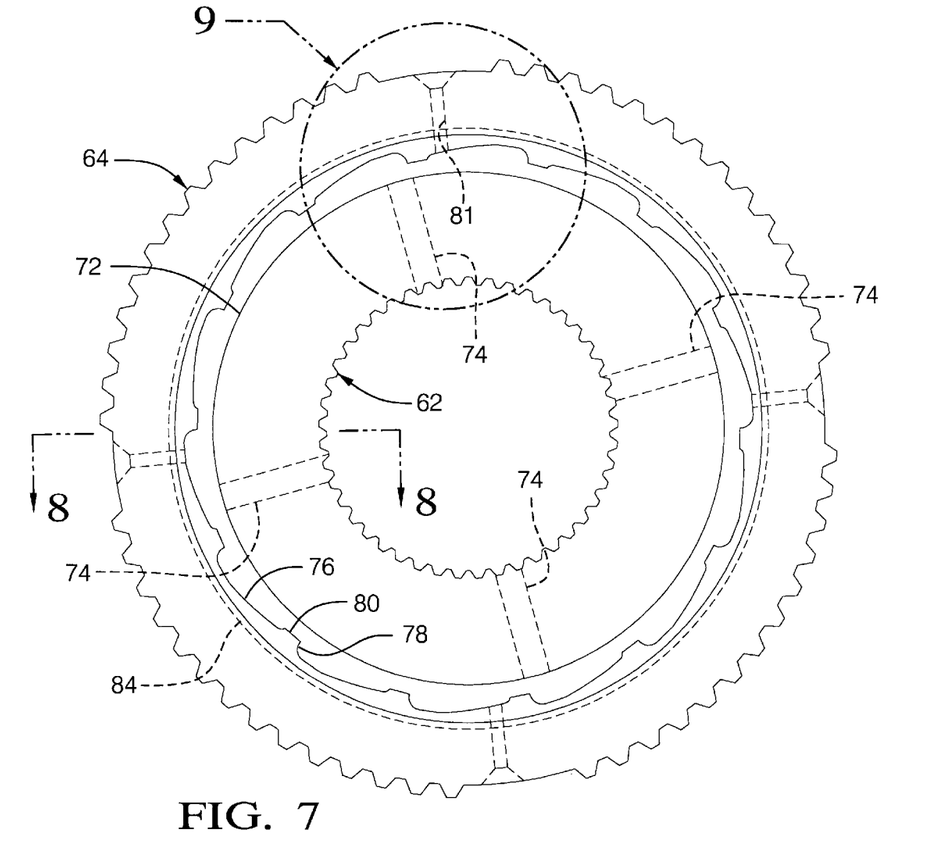
FIG. 7 is an axial view of the clutch races alone.
Figure 8:
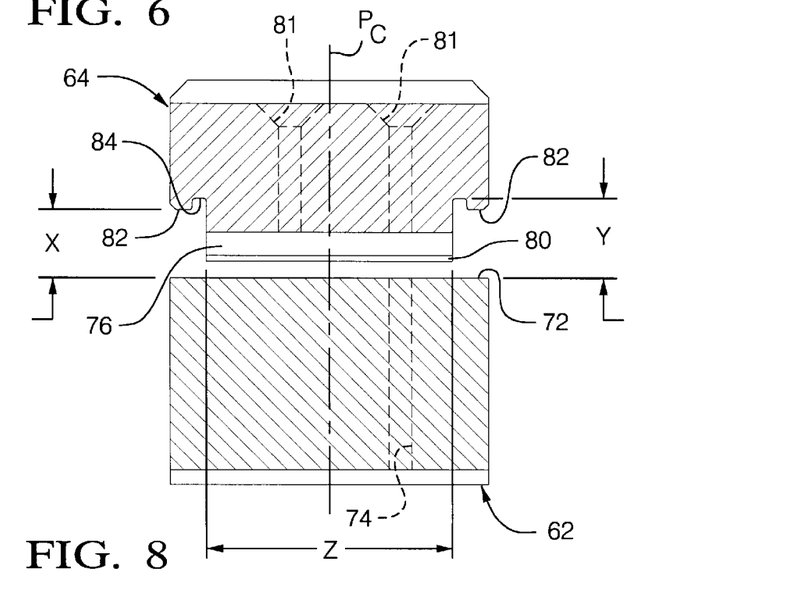
FIG. 8 is a cross sectional view of the races alone taken along the line 8—8 of FIG. 7.
Figure 9:
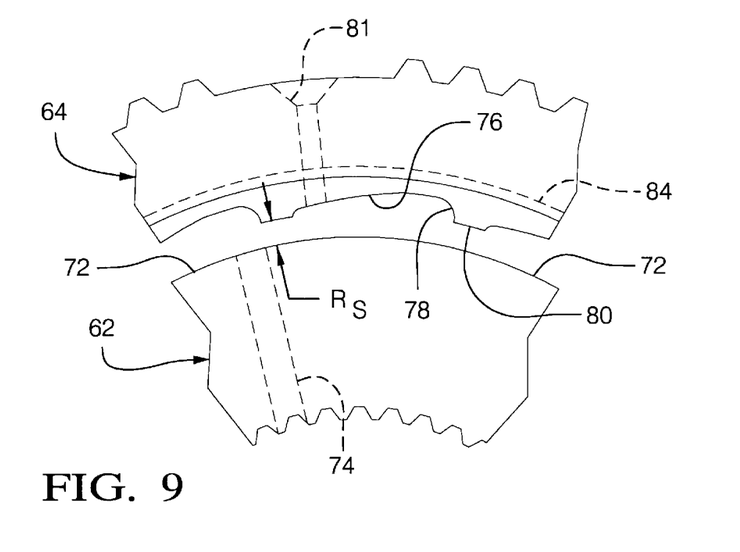
FIG. 9 is an enlarged portion of FIG. 7.
Figure 10:
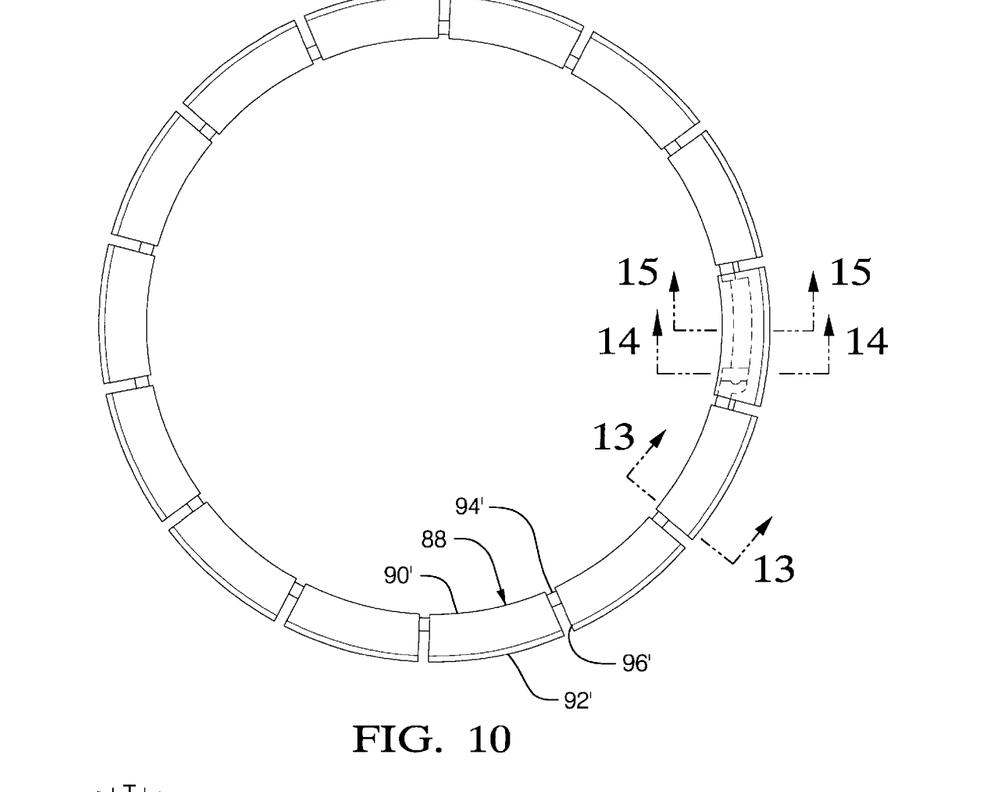
FIG. 10 is a an axial view of the outboard side of one cage half alone.
Figure 11:
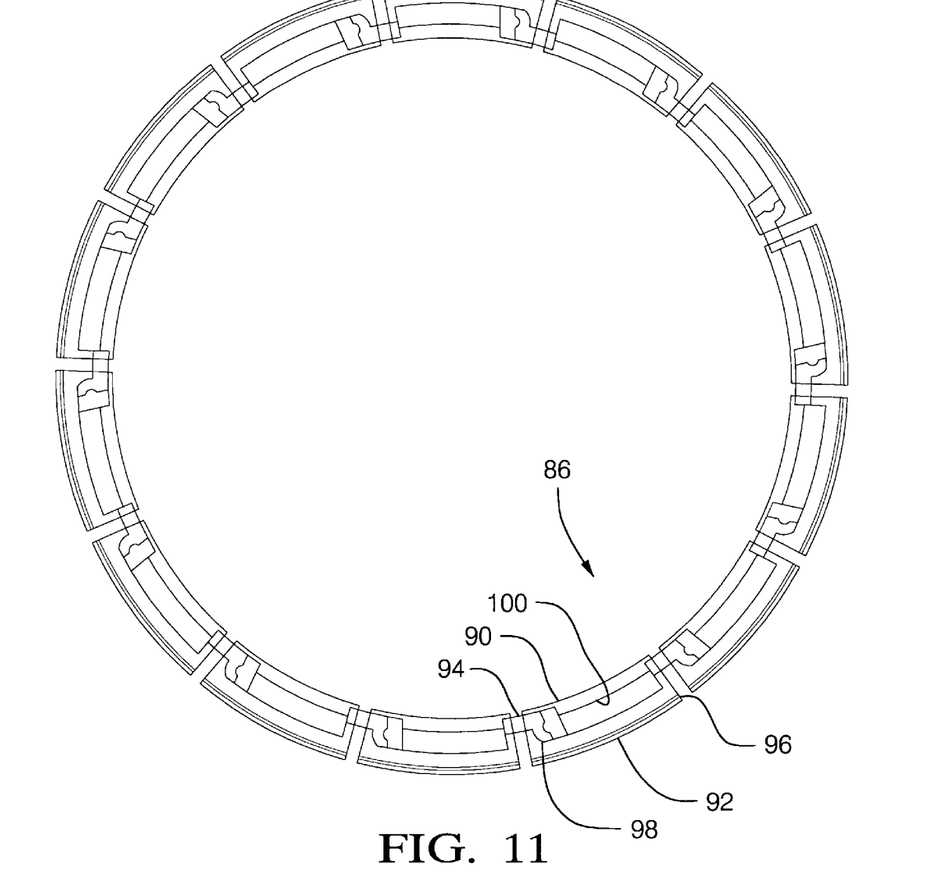
FIG. 11 is an axial view of the inboard side of the other cage half alone.
Figure 12:
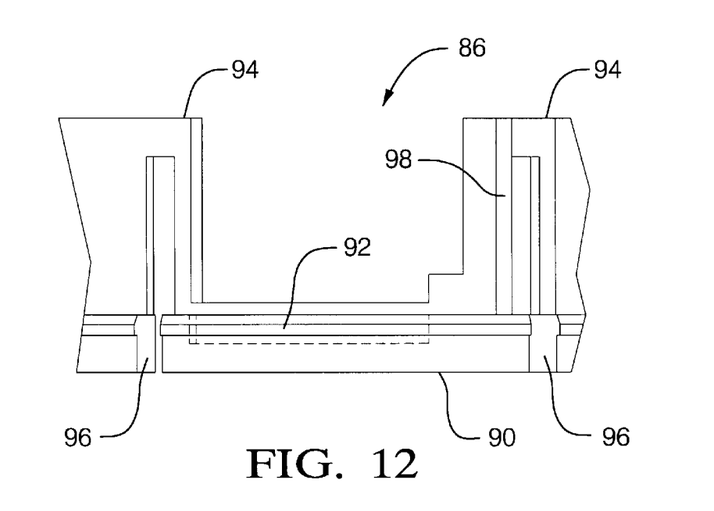
FIG. 12 is a radially inward view of a portion of the cage half shown in FIG. 11.
Figure 13:
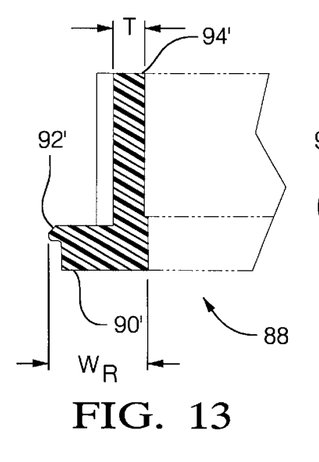
FIG. 13 is a cross sectional view taken along the line 13—13 of FIG. 10.
Figure 14:
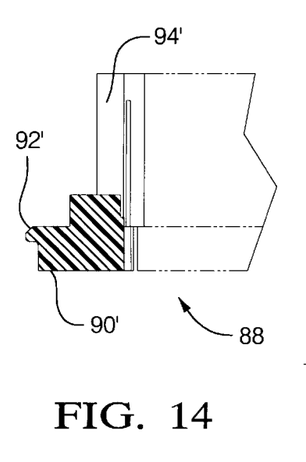
FIG. 14 is a cross sectional view taken along the line 14—14 of FIG. 10.
Figure 15:
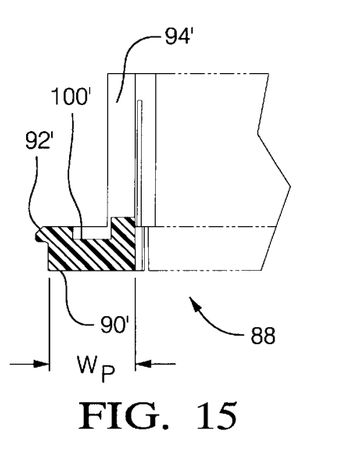
FIG. 15 is a cross sectional view taken along the line 15—15 of FIG. 10.
Figure 16:
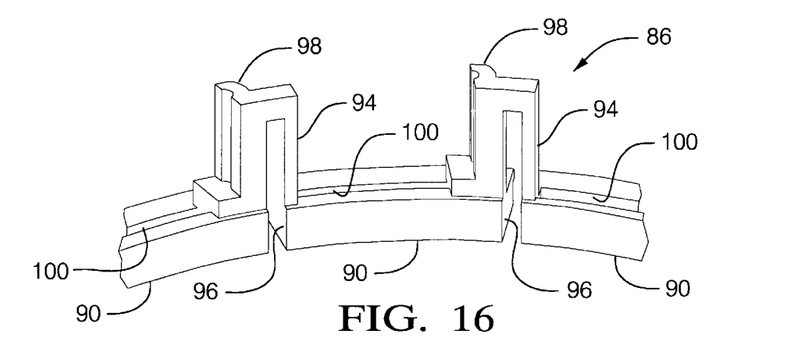
FIG. 16 is a perspective view looking radially inwardly at a portion of the cage half shown in FIG. 11.
Figure 17:
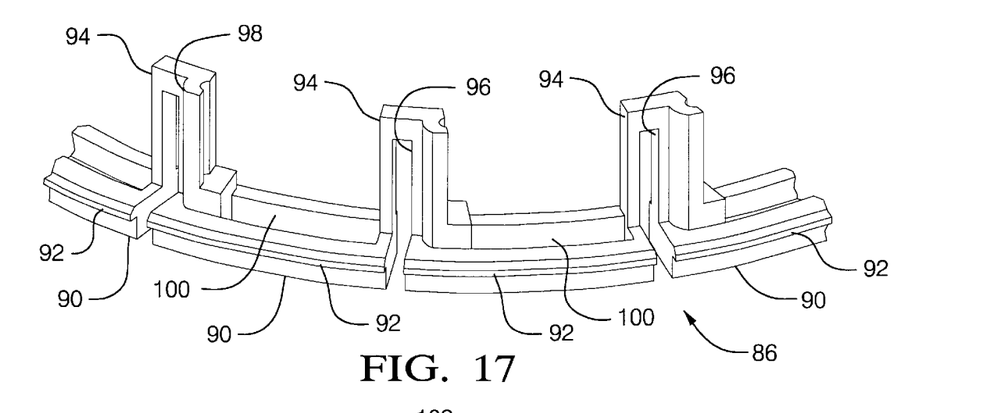
FIG. 17 is a perspective view looking radially outwardly at a portion of the cage half shown in FIG. 11.

Referring next to FIGS. 7, 8 and 9, details of the races 62 and 64 are illustrated. Inner pathway race 62 is basically conventional in size and shape, with a cylindrical inner pathway 72. Four evenly spaced oil passages 74 open radially through pathway 72. Outer race 64 has several conventional features, including the familiar saw-tooth shape comprised of fourteen evenly circumferentially spaced, shallow sloped cam ramps 76, steeply sloped cam hooks 78, and intervening semi cylindrical pads 80. Four evenly spaced pairs of oil passages 81 open from selected cam ramps pathway radially through the outer race 64 and to the disk pack 66. When the races 62 and 64 are coaxial, the pads 80 do have a substantially consistent radial spacing Rs from the pathway 72. However, that feature is not used for concentricity control between the races 62 and 64. Instead, machined into each annular end face of the cam race 64 is a cylindrical pilot surface 82, which has a diameter large enough to rest well clear and radially outboard of the cam ramps 76. When the races 62 and 64 are coaxial, pilot surface 82 has a predetermined radial spacing from the pathway 72, indicated at X. Machined adjacent to and just axially inboard of each pilot surface 82 is a circular retention groove 84, of larger diameter, and with a consequently larger radial spacing Y from the pathway 72. Each pair of adjacent pilot surfaces 82 and retention grooves 84 is evenly axially spaced to either side of a central plane Pc, with enough axial space Z between to accommodate the wedging elements, which are further described below. It is far simpler to precisely machine cylindrical and circular surfaces like 82 and 84, as compared to saw-toothed surfaces like 76 and 78, or even discontinuous semi cylindrical surfaces like 80. It is therefore possible to more precisely determine and maintain radial clearances like X and Y, which is used to advantage in the invention.

Referring next to FIGS. 10 through 17, the basic structural framework of roller clutch 60 is a pair of plastic molded cage halves, indicated generally at 86 and 88 respectively. Each is a mirror image of the other relative to the central plane Pc, rather than absolutely identical, since they are installed from opposite axial directions. Nevertheless, each is identical in size, and, relative to the central plane, identical in shape as well. Therefore, the specific structural features of cage half 86 are described and numbered, and the equivalent, mirrored features of the other cage half 88 are given the same number primed ('). Cage half 86 comprises a series of closely and evenly circumferentially spaced annular sections, 90, equal in number to the number of cam ramps 76. Each arcuate section 90 has a radial width Wp, measured from inner to outer edge, that is very slightly less than the radial spacing X, as defined above, a radial differential as small as about 0.25 diametral. This small radial differential is ultimately used to control concentricity. The circumferential length of each annular section 90 is relatively large, substantially equal to either side A or B of the wedging space as defined above. Therefore, most of the 360 degree circumference is subtended by the fourteen annular sections 90 together. Each arcuate section also has an axial thickness that is substantially equal to the total axial thickness of either side by side pilot surface-retention groove pair 82–84 which, in conjunction with the significant total circumferential length of all the sections 90, creates a significant amount of total inner and outer edge surface area available for concentricity control. Each cage half annular section 90 is integrally molded with a retention and sealing ring section 92 that extends radially outwardly thereof by slightly less than the radial depth of the retention groove 84, and with an equal circumferential length. The total radial width of ring section 92, indicated at Wr, is determined so that the radial differential between Y and Wr is deliberately greater than the radial differential between X and Wp, as much as double, but still small in absolute terms. Each ring section 92 is also axially thinner than retention groove 84 but still thick enough such that it is not inherently resilient or flexible, especially given the fact that it is integrally molded continuously along the relatively large circumferential length of an annular section 90.

Still referring to FIGS. 10–17, the adjacent annular sections 90 are joined and integrated by cross bars 94, each of which is approximately half as long as the distance Z defined above, and with a thickness T that is slightly less than Rs as defined above. Here, too, however the radial differential between Rs and T is greater than the radial differential between X and Wp. Since the cross bar 94 is molded integral to the adjacent annular sections 90, its inner surface can be tightly controlled so as to have only a very slightly greater diameter than the inner surface of the adjacent annular sections 90 that it joins, even as little as 0.1 mm more. The smallness of the cross bar clearance proves useful in oil retention during operation, as will appear below. Each cross bar 94 is molded with a narrow, axially extending slot 96 that runs almost to its, creating a basic U shape. As noted above, the total circumferential length of the annular sections 76 bounded by the slots 96 is large, and the total circumferential width of the slots 96 is conversely small. Each slot 96 is only about one to three degrees wide, just wide enough to provide a necessary mounting flexibility described below. The outer surface of each cross bar 94 is molded with a reaction ear 98 that is shape matched to a cam hook 78, while the remainder of its outer surface is shape matched to a pad 80. In addition, in the embodiment disclosed, the axially opposed inner surfaces of each cage half annular section 90 also has an arcuate slot 100, for a purpose described next.

Figures 18, 19:
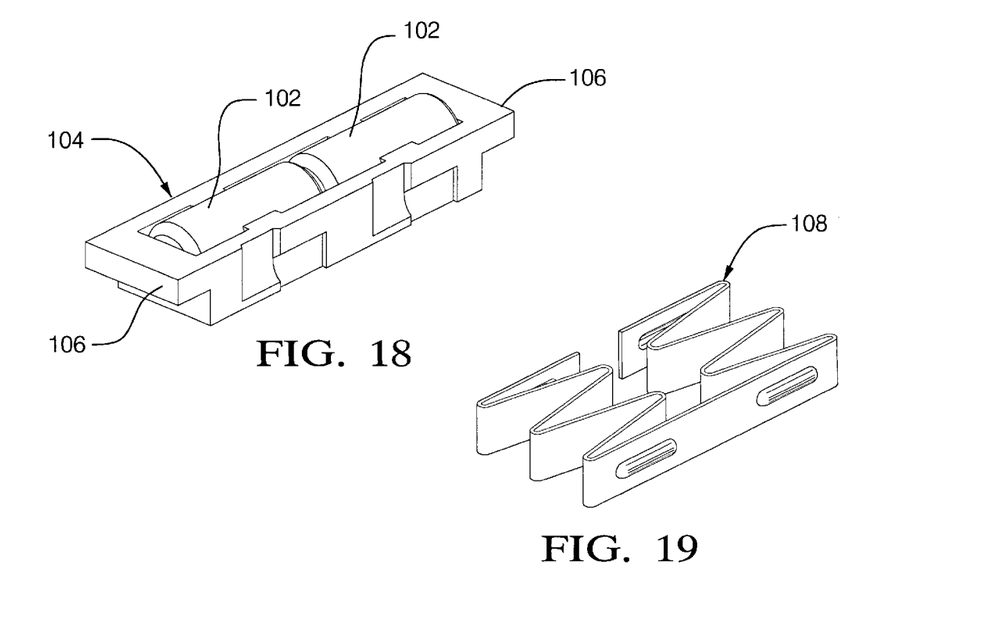
FIG. 18 is a perspective view of a roller control car and rollers.
FIG. 19 is a perspective view of a spring.

Referring next to FIGS. 18 and 19, the wedging elements comprise a plurality of pairs of cylindrical rollers 102 which, end to end, fit within the space Z defined above. Each pair of rollers 102 fit within a roller control car, indicated generally at 104, which, as the name implies, surrounds, holds and guides the rollers 102 as the move between the races 62 and 64. At each side of car 104, a shape matched guide rail 106 is provided to fit within a respective slot 100 between the cage halves 86 and 88. Each control car 104 is paired with a compression, leaf type energizing spring 108, which provides a wedging bias to a respective car 104 and its rollers 102. The cars 104 and cage halves 86 and 88 are assembled and installed as described next.

Figure 20:
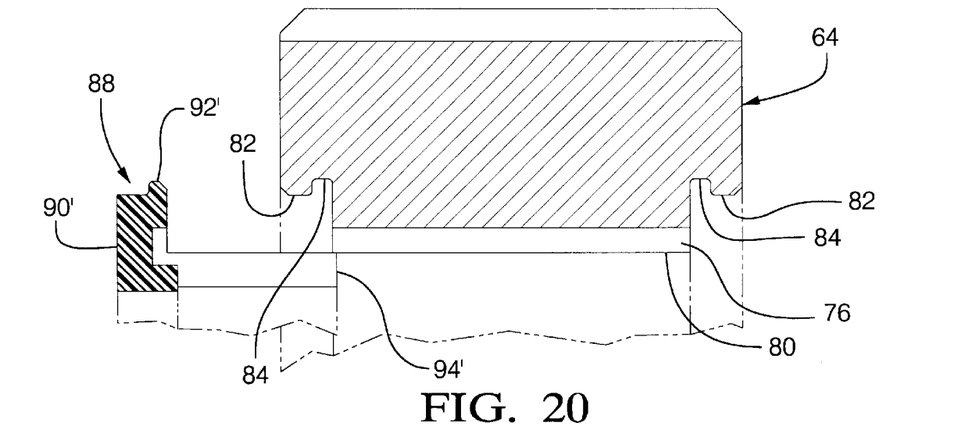
FIG. 20 shows one cage half beginning to be inserted axially onto the cam race.
Figure 21:
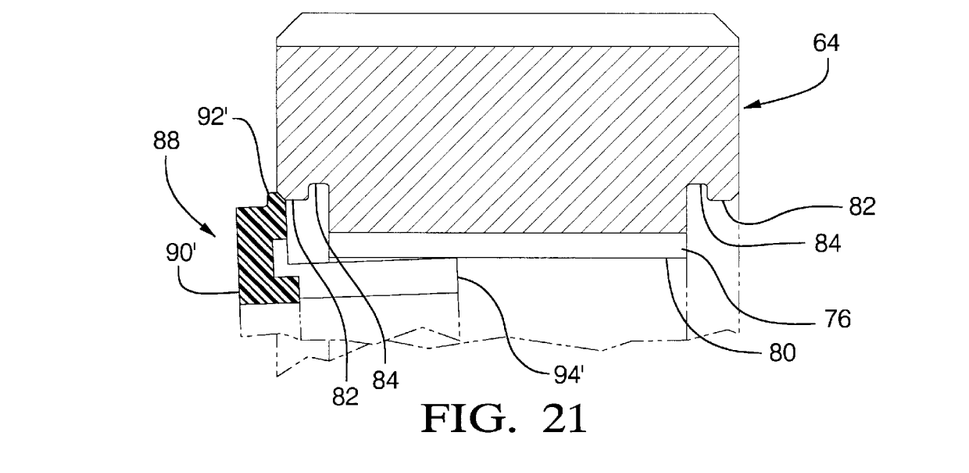
FIG. 21 shows the cage half farther along in the installation process.
Figure 22:
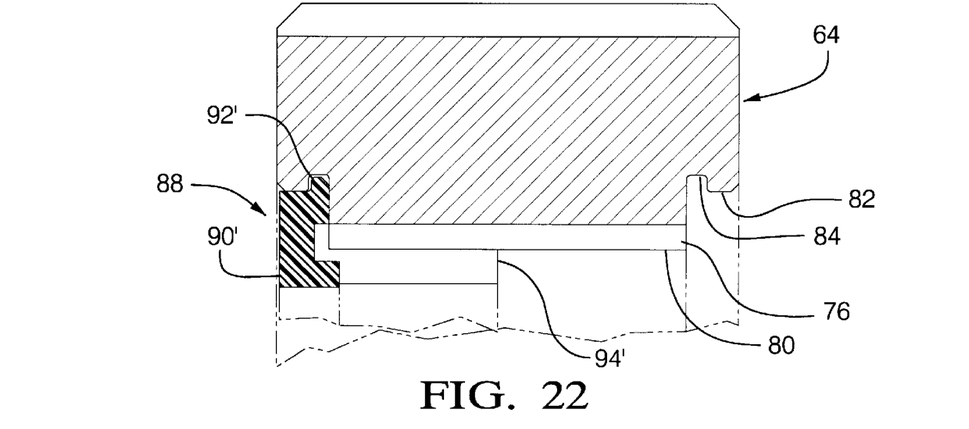
FIG. 22 shows the one cage half fully installed to the cam race.
Figure 23:
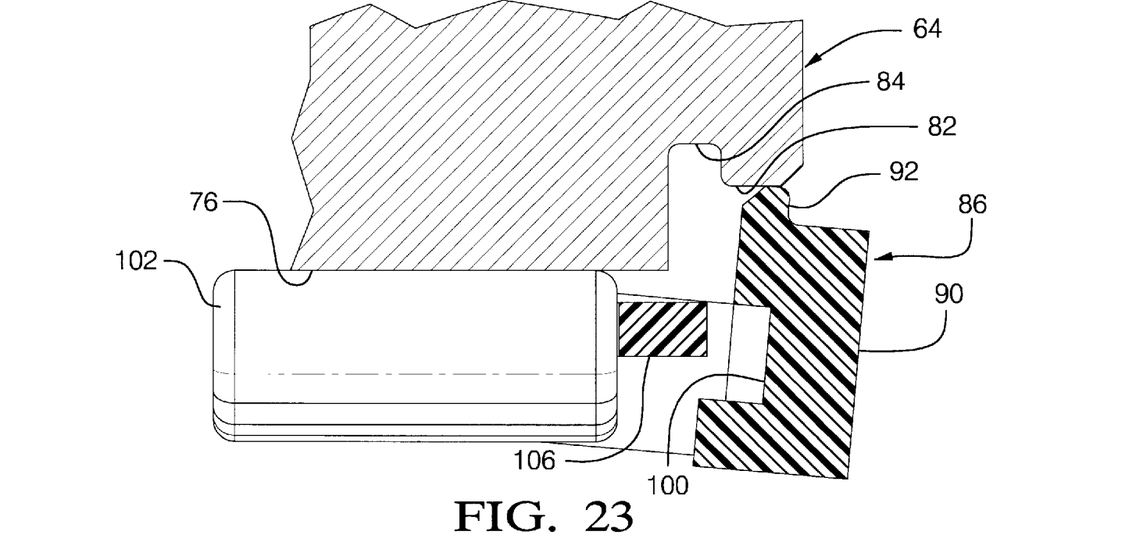
FIG. 23 shows the other cage half being installed.
Figure 24:
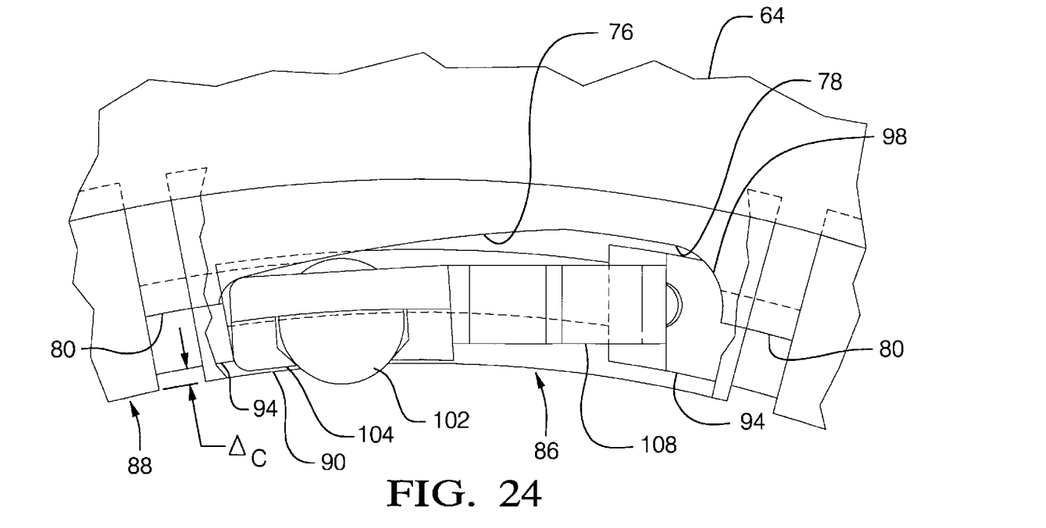
FIG. 24 shows an axial view of one section of the clutch fully installed to the cam race.

Referring next to FIGS. 20 through 24, the installation of the cage halves 86 and 88 to the cam race 64 and ultimately between both races 62 and 64 is illustrated. Initially, one cage half or the other (cage half 88 as shown) is installed to the outer, cam race 64 by indexing it until the reaction ears 98' register with the cam hooks 78 and the pushing it axially inwardly, as shown in FIG. 20. The reaction ears 98' slide inside and along the cam hooks 78 until the ring sections 92' engage and are forced radially inwardly by the pilot surface 82. Although the ring sections 92' are not themselves flexible, they need not be, since the entire cage half 88 is able to contract radially inwardly, because of the radial flexibility created by the slots 96'. As the stiff ring sections 92' are forced radially inwardly, the slots 96' close up, bending downwardly about the end of the cross bars 94' as shown in FIG. 21. Once the rings sections 92' have moved inboard of the pilot surface 82, the ring sections 92' shift radially outwardly and seat into the retention groove 84 as the cage half 88 re expands to its original shape, as shown in FIG. 22. The cage half 88 is self seating and aligning, without the need for a jig or tool. Next, the control cars 104, loaded with rollers 102, slide onto each cam ramp 76 with their guide rails 106 inserted into the arcuate slots 100'. Then, a spring 108 is loaded between each control car 104 and opposed cross bar 94, after which the other cage half 86 is installed identically to cage half 88, as shown in FIG. 23. As seen in FIG. 24, cam race 64 now has both cage halves 86 and 88 installed thereto, with the springs 108 and cars 104 captured axially between, completing clutch 60 on cam race 64. The ends of the respective cross bars 94–94' end up substantially abutted, but need not be physically tied together, since each cage half 86 and 88 is independently retained to race 64. After installation to cam race 64, the outer edge of each cross bar 94–94' fits closely against a respective cam race pad 80, but the inner edge has a clearance $\Delta c$ from the inner edges of the adjacent arcuate sections 90 which, as noted above, is very small at about 0.1 mm. The inner surfaces of the rollers 102 rest slightly radially inboard of the ultimate location of the pathway 72.

Figure 25:
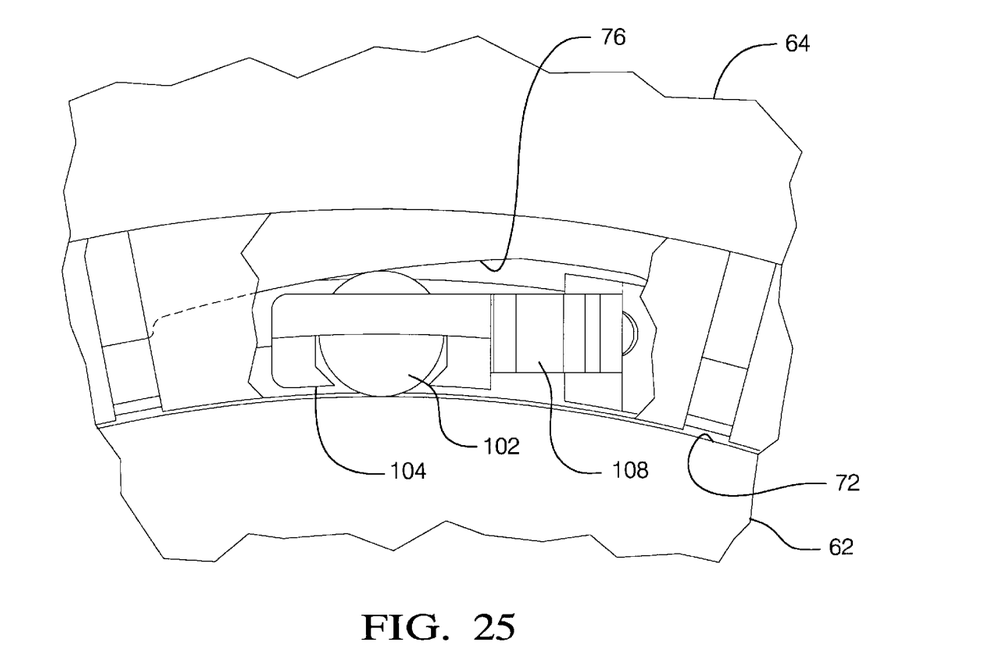
FIG. 25 shows an axial view of the pathway race installed inside the clutch.
Figure 26:
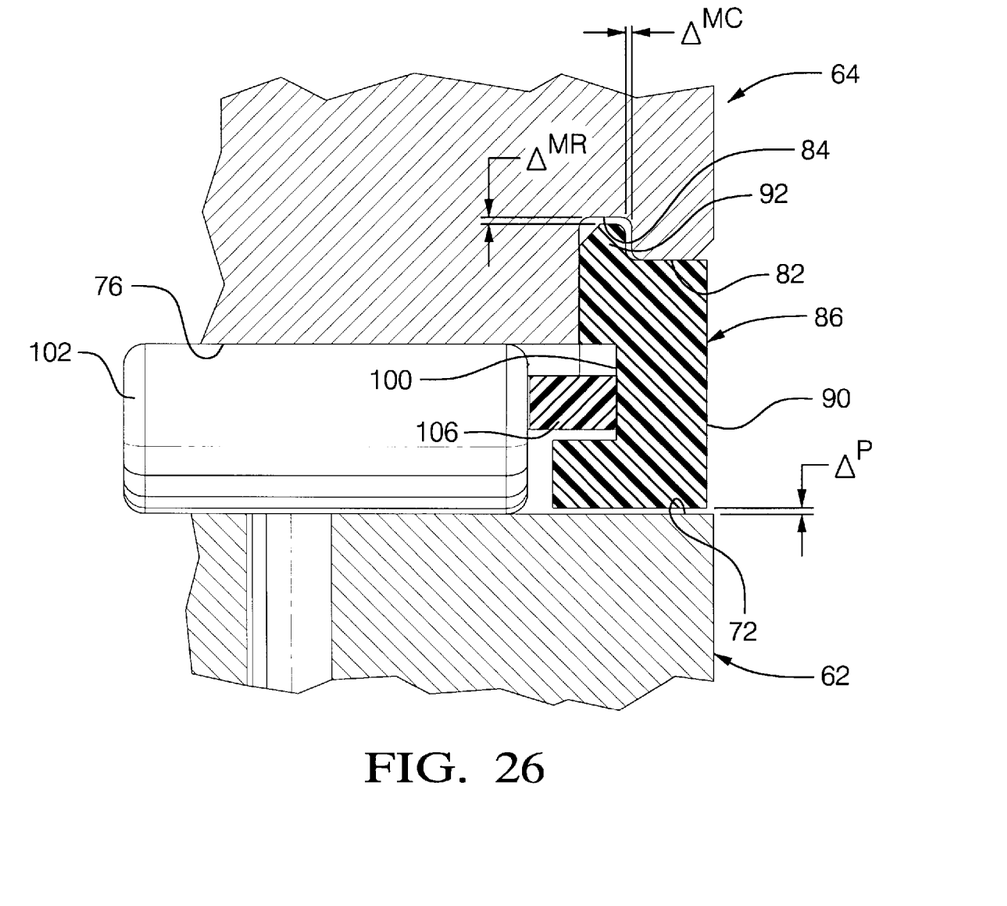
FIG. 26 is a cross section of the clutch fully installed between both races, showing the various post installation clearances.

Referring next to FIGS. 25 and 26, the next step is to install the pathway race 62 inside of the rollers 102 by pushing it axially inwardly with a slight clockwise (from the perspective of FIG. 25) twist to roll the roller pairs 102 up the cam ramps 76 and compress the springs 108. Post installation, as best seen in FIG. 25, the outer surface of the reaction ears 98–98' closely engage the cam hooks 78, and the outer surfaces of the cross bars 94–94' closely engage the pads 80. Therefore, every wedging space as defined above is substantially enclosed, but for the small cross bar clearances $\Delta c$ on two sides and the small pilot clearance $\Delta p$ on the other two sides. There is a radial mounting clearance $\Delta mr$ associated with the ring sections 92–92', equal to the radial differential between Y and Wr described above, and a roughly comparable axial mounting clearance, $\Delta$ mc, as well. Relative to the radial mounting clearance $\Delta mr$, the pilot clearance $\Delta p$ (the radial differential between X and Wp as defined above) is deliberately made smaller only approximately 0.25 mm. The cross bar clearance $\Delta c$ assures that the inner surfaces of the cross bars 94–94' do not ride on the pathway 72 and do not interfere with the riding of the inner surfaces of the annular sections 90–90' on the pathway 72.

Figures 27, 28:
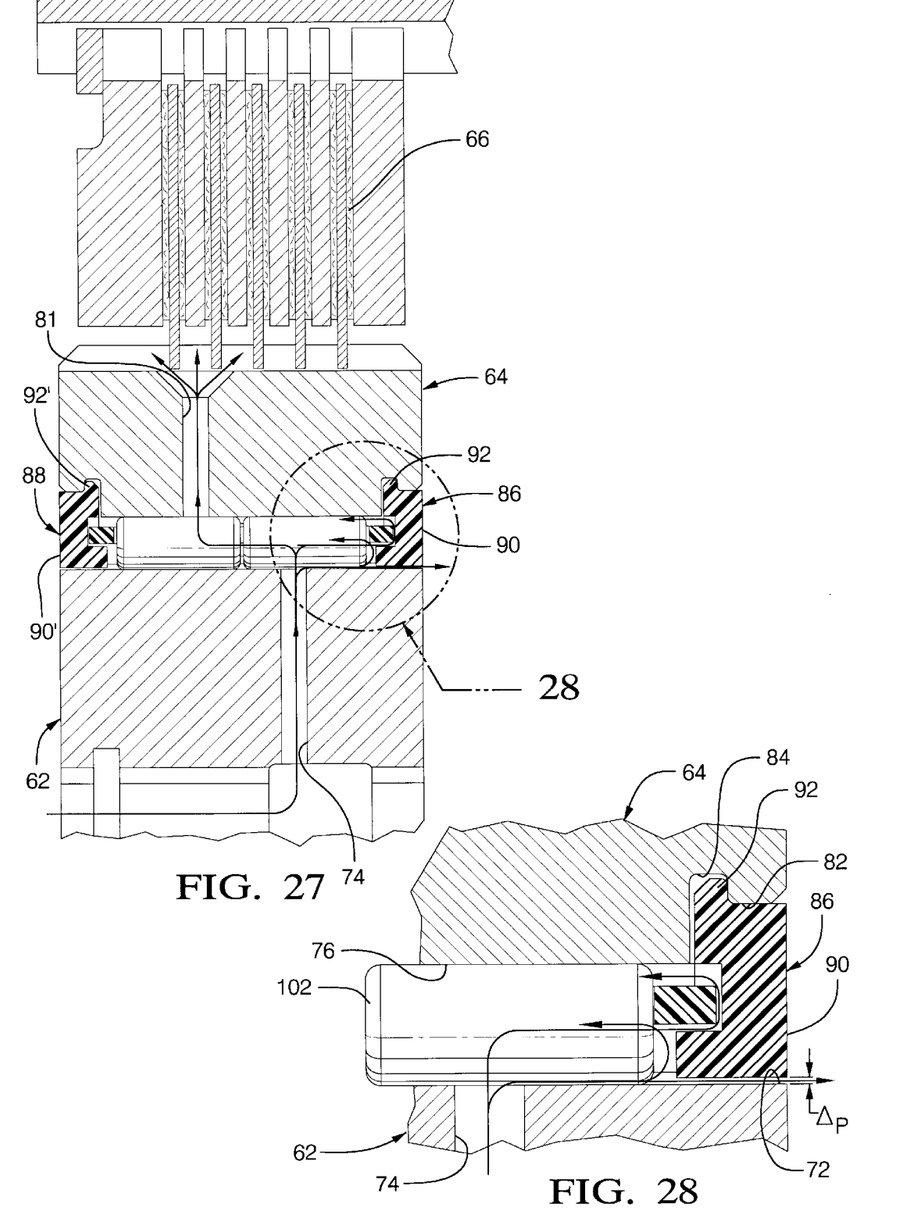
FIG. 27 is a cross section of the clutch and clutch races at work in a transmission.
FIG. 28 is an enlargement of a portion of FIG. 27.

Referring next to FIGS. 27 and 28, the operation of clutch 60 is illustrated. When the races 62 and 64 over run, the inner and outer edges of the annular sections 90–90' run close to the pathway 72 and pilot surface 82 respectively, given the small radial pilot clearance, thereby maintaining close concentricity between the two races 62 and 64. Concentricity maintenance is not interfered with by any other cage structure, because of the larger mounting clearance $\Delta mr$ (larger than $\Delta p$, and because of the cross bar clearance $\Delta c$. The large total proportion of the circumference of pathway 72 subtended by the annular sections 90–90' assures that there is more than adequate contacting surface area for load support and concentricity control, even though the cross bars 94–94' do not ride on pathways 72. Oil under pressure flows radially out through the passages 74 and between the annular sections 90–90', forcing them axially outwardly. The pressure bearing axially outwardly against the inner surfaces of the annular sections 90 and 90' forces the outer faces of the ring sections 92–92' axially outwardly and tightly against the radially overlapping outer surfaces of the retention grooves 84. Because of the large total surface area of the flat ring sections 92–92', which is less than 360 degrees only to the extent of the total open area represented by the fourteen narrow slots 96–96', most of the potential leak path past the pilot surfaces 82 is blocked. The higher the pressure, the tighter the seal created, and the relative axial thickness of the annular sections 90–90' prevents any significant outward buckling. Likewise, the inherent stiffness of the ring sections 92–92' prevents them from being blown out of the retention grooves 84. Retention is much stronger than that provided by the much smaller surface area of the barbs 54–54' described above. While the wedging spaces are well enclosed on all four sides, some oil is able to leak out axially to the sides through the radial pilot clearance $\Delta p$, but this is needed to assure that sufficient lubrication is fed between the inner edges of the annular sections 90–90' and the pathway 72, as indicated by the arrows in FIGS. 27 and 28, when the clutch 60 is over running. The only pressurized oil able to leak out directly would be that which was forced directly into the narrow slots 96–96', to the extent that they align angularly with the inner oil passages 74, an event minimized by the narrowness of the slots 96–96'. Oil otherwise trapped in the wedging spaces and between the axially opposed annular sections 90–90' could indirectly escape, through the cross bar clearances $\Delta c$, into the adjacent slots 96–96'. However, that leakage can be minimized, since $\Delta c$ can be minimized while still assuring no contact of the cross bars 94–94' with the pathway 72, and thus no interference with the concentricity control provided by the close pilot clearance $\Delta p$.

In conclusion, the controlled diameter annular sections 90–90', in conjunction with the large surface area integral ring sections 92–92', provide improved concentricity control, improved lubricant retention, and improved mechanical retention, all in an easily installed package, with no compromise among the three improved features.

We claim:

1. In combination, a pair of inner and outer, radially spaced roller clutch races and roller clutch installed therebetween and adapted for use in an environment where pressurized lubricant is forced into the radial space between the races, comprising, an outer cam race including an evenly circumferentially spaced plurality of wedging spaces of predetermined circumferential length bounded by a pair of axially spaced cylindrical pilot surfaces, each pilot surface being axially adjacent to a circular retention groove of larger diameter, an inner pathway race coaxial to said outer cam race and having a cylindrical pathway with a predetermined radial spacing from said pilot surfaces, a roller clutch cage comprising a pair of one piece, substantially identical cage halves mirror imaged about a central plane, each cage half including a plurality of evenly spaced, annular sections, each having a circumferential length substantially equal to a wedging space and a radial width with a predetermined radial pilot clearance relative to the pilot surface-pathway radial spacing, each annular section also having an integral ring section of equal circumferential length extending radially outwardly therefrom to an outer edge having a radial mounting clearance relative to the retention groove that is slightly greater than the radial pilot clearance, and a flat outer face with an axial thickness slightly less than the retention groove, each annular section being joined to the adjacent annular section by an equal plurality of integrally molded cross bars, each of which cross bars is cut by an axially extending slot and which further has a radial clearance relative to its adjacent annular sections that is less than the radial pilot clearance, whereby the cage halves can be installed by forcing them axially into the radial space between the races from opposite axial directions so that the ring sections are forced radially inwardly to contract the cage halves radially as the axially extending slots close up, until the ring sections move into the retention grooves and the cage halves reexpand, after which, during clutch operation, the predetermined radial pilot clearance maintains race concentricity without interference from the larger radial mounting clearance, while pressurized lubricant forces the cage halves axially outwardly in opposite directions to force the ring section flat faces against the retention grooves, thereby providing a substantially complete lubricant seal.

2. In combination, a pair of inner and outer, radially spaced roller clutch races and roller clutch installed therebetween and adapted for use in an environment where pressurized lubricant is forced into the radial space between the races, comprising, an outer cam race including an evenly circumferentially spaced plurality of wedging spaces of predetermined circumferential length bounded by a pair of axially spaced cylindrical pilot surfaces, each pilot surface being axially adjacent to a circular retention groove of larger diameter, an inner pathway race coaxial to said outer cam race and having a cylindrical pathway with a predetermined radial spacing from said pilot surfaces, a roller clutch cage comprising a pair of one piece, substantially identical cage halves mirror imaged about a central plane, each cage half including a plurality of evenly spaced, annular sections, each having a circumferential length substantially equal to a wedging space and a radial width with a predetermined radial pilot clearance relative to the pilot surface-pathway radial spacing, each annular section also having an integral ring section of equal circumferential length extending radially outwardly therefrom to an outer edge having a radial mounting clearance relative to the retention groove that is slightly greater than the radial pilot clearance, and a flat outer face with an axial thickness slightly less than the retention groove, each annular section being joined to the adjacent annular section by an equal plurality of integrally molded cross bars, each of which cross bars is cut by an axially extending slot and each of which has an inner edge with a small radial cross bar clearance relative to the inner edges of the adjacent annular sections, whereby the cage halves can be installed by forcing them axially into the radial space between the races from opposite axial directions so that the ring sections are forced radially inwardly to contract the cage halves radially as the axially extending slots close up, until the ring sections move into the retention grooves and the cage halves re expand, after which, during clutch operation, the predetermined radial pilot clearance maintains race concentricity without interference from the larger radial mounting clearance, while pressurized lubricant forces the cage halves axially outwardly in opposite directions to force the ring section flat faces against the retention grooves, thereby providing a substantially complete lubricant seal.

3. A roller clutch according to claim 2, further characterized in that the cam race includes an evenly spaced plurality of sloped cam ramps, oppositely spaced cam hooks, and intervening, semi cylindrical pads defining said wedging spaces, and in which the outer surfaces of the cage cross bars make close contact with said cam hooks and pads.

* * * * *